W. R. Hampton,
Cage Trap.
No. 109,614. Patented Nov. 29, 1870.
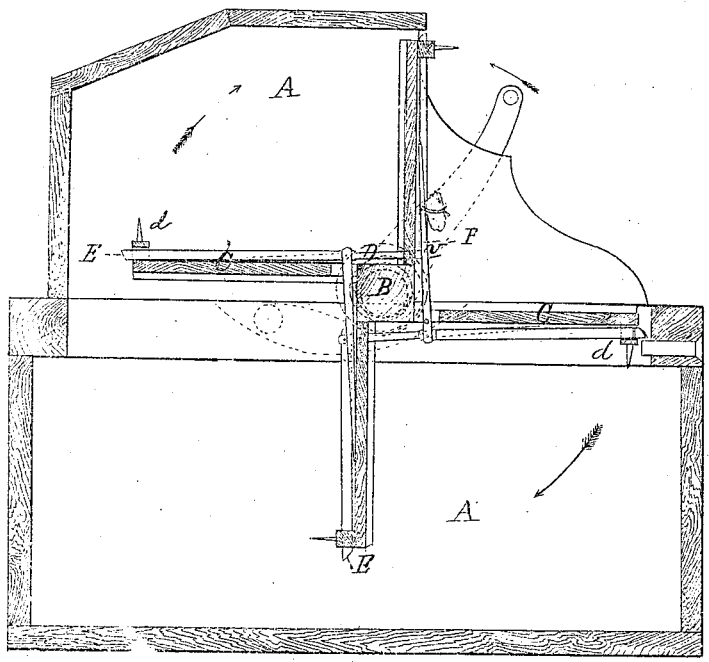
Witnesses:
Chas Kenyon
F. B. Curtis
Inventor:
W. R. Hampton,
Chipman, Hosmer & Co,
Attys.

United States Patent Office.

WILLIAM R. HAMPTON, OF FAIRFIELD, ILLINOIS.

Letters Patent No. 109,614, dated November 29, 1870.

IMPROVEMENT IN ANIMAL-TRAPS.

The Schedule referred to in these Letters Patent and making part of the same.

*To all whom it may concern:*

Be it known that I, WILLIAM R. HAMPTON, of Fairfield, in the county of Wayne and State of Illinois, have invented a new and valuable Improvement in Animal-Traps; and I do hereby declare that the following is a full, clear, and exact description of the construction and operation of the same, reference being had to the annexed drawing making a part of this specification, and to the letters and figures of reference marked thereon.

Figure 1 of the drawing is a central vertical transverse section of my invention.

My invention relates to means for catching rats and other small animals; and

It consists in the construction and novel arrangement of a case, with a system of radial wings pivoted therein, provided with teeth, and actuated, when released from the automatic set-stop by the action of pulling the bait, by a powerful coiled spring, in such a manner that the wing upon which the rat stands gives way beneath it at the same time that the adjacent wing descends upon it, striking it with its teeth and carrying it forcibly downward into the trap.

The letter A of the drawing designates the case.

B is a shaft pivoted to the lateral walls of the case, and provided with the radial wings C C, having each a row of sharp spikes or teeth, *d d*, projecting from the outer edge in the direction of rotation.

D represents a powerful coiled spring, one end of which is attached to the case, and the other end to the shaft B. This spring is arranged to cause the platform wing, or that one upon which the rat may be standing, to rotate downward, all the others moving with it in the same direction, which is indicated by the arrow in the drawing.

The letter *v* represents the lever to which the bait is attached. This lever passes upward through a slot in the wing, as shown, and care must be taken to form such slot considerably larger in each direction than the lever, in order to provide play room.

It will be observed that the bait-lever above mentioned has an upright position, and the point thereon at which the bait is to be attached is at considerable distance from the point at which said lever is pivoted to the transverse bar underneath the wing. By this arrangement great leverage is secured, and almost positive certainty assured that if the bait be drawn either to the right, left, or front the trap will be found operative.

In this respect my device varies materially from that of Oliver Metcalf, patented January 14, 1868. I disclaim any right of invention to anything shown in said patent.

My trap is set automatically by means of the following devices:

E represents a spring bolt arranged to engage with a catch in the edge of the case.

F is a pointed lever whose short arm is pivoted to the bolt E, and whose long arm projects upward through the wing to receive the bait. Each wing is provided with such a lever and spring bolt, and as soon as a rat is conveyed downward into the trap it is re-set and ready for another.

Claim.

The combination of the case A, spring D, shaft B, toothed wings C, and bait-lever *v*, when constructed and arranged to operate substantially as and for the purpose specified.

In testimony that I claim the above, I have hereunto subscribed my name in the presence of two witnesses.

WILLIAM R. HAMPTON.

Witnesses:
C. C. BOGGS,
W. H. ROBINSON.